July 16, 1968
JAMES E. WEBB
ADMINISTRATOR OF THE NATIONAL
AERONAUTICS AND SPACE ADMINISTRATION
POWER SUPPLY CIRCUIT
Filed Dec. 8, 1964
3,393,347
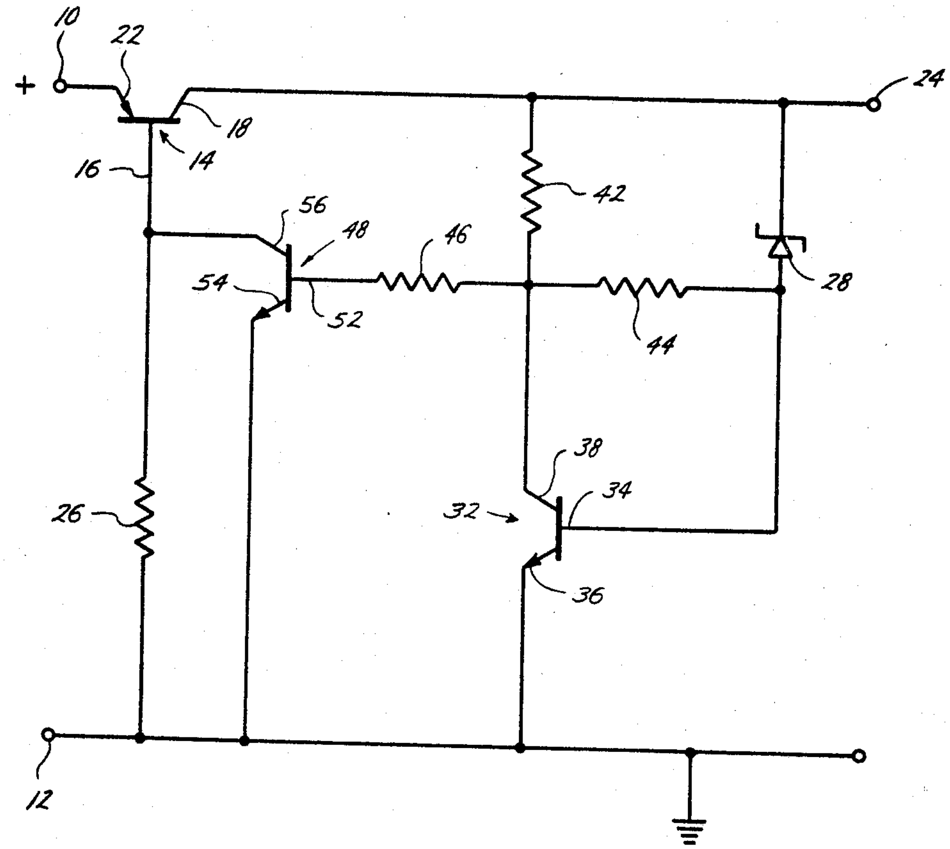
Donald D. Boedy
INVENTOR.
BY Geo. McCoy
Harvey S. Hertz
ATTORNEYS

United States Patent Office 3,393,347

Patented July 16, 1968

3,393,347

POWER SUPPLY CIRCUIT

James E. Webb, Administrator of the National Aeronautics and Space Administration with respect to an invention of Donald D. Boedy, Godfrey, Ill.

Filed Dec. 8, 1964, Ser. No. 416,945
4 Claims. (Cl. 317—31)

ABSTRACT OF THE DISCLOSURE

The power supply of the present invention is designed so that the manufacturer specifications for the series stage transistor are not exceeded. Should a short circuit on the output side of the series stage transistor occur, the transistor will not be destroyed because the decrease in output voltage is utilized to drive the transistor toward cut-off. Furthermore, protection of the regulated power supply output wiring and the unregulated power supply input need not be provided since the maximum current can be predicted.

This invention described herein was made in the performance of work under a NASA contract and is subject to the provisions of Section 305 of the National Aeronautics and Space Act of 1958, Public Law 85–568 (72 Stat. 435, U.S.C. 2457).

This invention relates in general to regulated power supplies and, more particularly, to a power supply containing overload protection for a series stage transistor.

In a transistorized direct-current (D.C.) power supply where an unregulated voltage is applied to the input terminals and a regulated output voltage is taken off the output terminals, normally the collector-emitter circuit of a series stage transistor is connected between one of the input and output terminals. Should the load current become excessive at the output terminals thus causing a large amount of current to flow through the series transistor, normally the transistor would be destroyed. Further, the unregulated input power supply could also be damaged by the excessive current flow.

In order to overcome the attendant disadvantages of prior art regulated power supplies, the power supply of the present invention is designed so that the manufacturer specifications for the series stage transistor are not exceeded. Should a short circuit on the output side of the series stage transistor occur, the transistor will not be destroyed because the decrease in output voltage is utilized to drive the transistor toward cut-off. Furthermore, protection of the regulated power supply output wiring and the unregulated power supply input need not be provided since the maximum current can be predicted.

More particularly, the circuit comprises a first input terminal for supplying a source of unregulated D.C. voltage to the emitter of a series stage transistor. The collector of the series stage transistor is connected to a regulated voltage output terminal and the base is connected to a second input terminal through a first resistor. Also connected to the output terminal is the cathode of a Zener diode, the anode of which is connected to both one side of a second resistor and the base of a first control transistor. The other side of the second resistor is connected to the collector of the first control transistor while the emitter is connected to the second input terminal. Further, the collector of the first control transistor is connected through a third resistor to the first output terminal and through a fourth resistor to the base of a second control transistor. The emitter of the second control transistor is connected to the second input terminal and the collector is connected to the base of the series stage transistor.

Any changes in the output regulated voltage varies the current in the Zener diode causing the signal to the control sections to vary the impedance of the collector-emitter circuit of the series stage transistor thus maintaining a regulated output voltage. If the load current becomes excessive, the current through the Zener diode decreases and bias for the amplifying section is obtained through the second resistor which is chosen so that it will drive the series stage transistor toward cut-off. Thus, any load up to and including a short circuit can be imposed upon the regulator circuit described with no adverse effect.

The advantages of this invention, both as to its construction and mode of operation, will be readily appreciated as the same becomes better understood by reference to the following detailed description when considered in connection with the accompanying drawing, and wherein:

The figure is a circuit diagram of a regulated power supply containing the overload protection circuit in accordance with this invention.

Referring now to the drawing, there is shown a regulated power supply containing the novel load protection circuit of the subject invention. Unregulated D.C voltage is applied across a pair of input terminals 10, 12. A series stage transistor 14 having a base 16, collector 18, and emitter 22 is connected by means of the emitter terminal to the unregulated voltage line terminal 10, and its collector 18 is connected to a regulated voltage line terminal 24. The base of the transistor 14 is connected through a resistor 26 to terminal 12. A Zener diode 28 having its cathode connected to the unregulated output voltage line terminal 24 is connected by its anode terminal to a first control transistor 32 at its base terminal 34. The emitter 36 of the transistor 32 is connected to the terminal 12 whereas the collector 38 is connected through a biasing resistor 42 to the output voltage line terminal 24. An overload protection resistor 44 is connected between the anode of Zener diode 28 and the collector 38 of the transistor 32. Further, the collector 38 is connected through a resistor 46 to a second control transistor 48 at its base terminal 52. The emitter 54 of the second control transistor is connected to the terminal 12 and the collector 56 is connected to the base 16 of the series stage transistor.

With the foregoing in mind, operation of the above described circuit is as follows:

With an unregulated positive D.C. voltage applied to the terminal 10, the emitter-base circuit of the transistor 14 is forward biased allowing base current of the transistor 14 to flow through the resistor 26. Thus, initial conduction of the transistor 14 occurs and the voltage at output terminal 24 starts to rise. The output voltage at terminal 24 is sensed by a Zener diode 28. When the voltage to the output terminals of circuit exceeds a value which is greater than the breakdown voltage of the Zener diode 28 and the voltage across the base-emitter circuit of the control transistor 32, any further increases in output voltage will cause an increase in the current through the Zener diode.

As can readily be seen, this increase will change the voltage across that emitter-base circuit of transistor 32, which in turn is amplified by control transistor 48. The output signal of transistor 48 is applied to the base of transistor 14 which in turn varies the impedance of the collector-emitter circuit of the series stage transistor 14. Thus, the change in impedance across the collector-emitter circuit of transistor 14 will increase or decrease the output voltage across the output of the circuit. Therefore, rises in the output voltage are sensed by the Zener diode 28 causing the impedance of collector-emitter circuit of transistor 14 to increase wnereas voltage drops across the output terminal will in turn cause the impedance across the collector-emitter circuit of transistor 14 to decrease. Due to this closed-loop operation the output voltage will stabilize within a few tenths of a volt of the Zener diode voltage provided the load current is not excessive and the input voltage is greater than the voltage necessary to break down the Zener diode 28.

If, however, the load current becomes excessive, the current through the Zener diode 28 will decrease and the bias for the transistor 32 will be obtained through the resistor 44. Under these conditions, the output signal of the transistor 32 will drive the transistor 48 and hence the series stage transistor 14 to a near cut off condition. The same sequence will also occur if the input voltage to the terminals 10, 12 decreases below the level required to operate the Zener diode in reverse bias condition.

With the resistor 44 installed in the circuit, an increase in load current beyond a predetermined level will cause a decrease in output voltage, thereby limiting the current to a maximum amount which is adjusted by the resistor 44. Thus, the series stage transistor 14 can be designed into the circuit and the resistor 44 chosen so that the manufacturer's specification for maximum current through the transistor 14 is never exceeded. Thus, a short circuit across the output terminals of the voltage regulator will not destroy the series transistor because this decrease in output voltage drives the transistor 14 toward cut-off. Furthermore, the input current through the terminals 10, 12 of the regulated power supply is only equal to the load current plus the small current drain from amplifier sections comprising the transistors 32 and 48. Therefore, protection of the unregulated power supply need not be provided since the maximum current is known and can be anticipated for any output up to and including a short circuit.

Thus, an output up to and including a short circuit can be imposed upon the voltage regulator described with no adverse effect and no reset turnoff or readjustment required to enable the regulator to recover from an excessive load current. Thus, it is not necessary to either totally remove the load or to remove power from the input terminals 10, 12 to enable the regulator to once again regulate the output circuit.

The Zener diode 28 further provides filtering properties for the regulator. A ripple in the input unregulated voltage normally would create an error signal in the output across the Zener diode 28. This error signal in turn would be fed to the base of the transistor 32 and in turn a corrective signal imposed on the base of the transistor 14 reducing the ripple across the output terminals of the circuit. Thus, a ripple or transient in the input unregulated voltage is reduced by the combined gain of the transistors 32, 48, and 14, as long as the ripple exceeds the Zener diode 28 breakdown voltage.

It is clear that other variations of the protective circuit are possible, but, of course, the circuit operation would be basically the same. Also, modifications could be provided whereby the series stage transistor would be on a negative line instead of a positive line.

It should be further understood that the foregoing disclosure relates only to preferred embodiments of the invention, and that it is intended to cover all changes and modifications of the examples in the invention herein chosen for the purposes of the disclosure which do not constitute departures from the spirit and the scope of the invention.

What is claimed and desired to be secured by Letters Patent is:

1. A regulating circuit for a source of unidirectional unregulated voltage comprising:
   (a) a first input terminal and a second input terminal between which said unregulated voltage can be applied;
   (b) a first output terminal and a second output terminal for deriving a regulated unidirectional voltage therebetween;
   (c) a series stage transistor having a base, an emitter, and a collector;
   (d) means connecting the emitter and collector of said series stage transistor to said first input terminal and said first output terminal, respectively;
   (e) means connecting said second input terminal to said second output terminal;
   (f) means providing a path for current flow in the base of said series stage transistor when said unregulated voltage is first impressed across said input terminals comprising a resistor connected between the base of said series stage transistor and said second input terminal;
   (g) means for maintaining the voltage level across said output terminals at a predetermined value comprising:
      (1) a first control transistor having a base, an emitter, and a collector;
      (2) a second control transistor having a base, a collector, and an emitter;
      (3) a resistor connecting the collector of said first control transistor to the base of said second control transistor;
      (4) means connecting each of the emitters of said first and second control transistors to said first input terminal;
      (5) means connecting the collector of said second control transistor to the base of said series stage transistor;
      (6) a biasing resistor connecting the collector of said first control transistor to said first output terminal; and
      (7) means for sensing the voltage at said first output terminal and applying a signal proportional thereto to the base of said first control transistor comprising a Zener diode having its anode connected to the base of said first control transistor and its cathode connected to said first output terminal; and
   (h) a resistor connection between the collector and base of said first control transistor for decreasing the output voltage at the output terminals when the load current increases beyond a predetermined value.

2. A regulating circuit for a source of unidirectional unregulated voltage comprising:
   a first input terminal and a second input terminal between which said unregulated voltage can be applied;
   a first output terminal and a second output terminal for deriving a regulated unidirectional voltage therebetween;
   a series stage transistor having a base, an emitter, and a collector;
   means connecting the emitter and collector of said series stage transistor to said first input terminal and said first output terminal, respectively;
   means connecting said second input terminal to said second output terminal;
   means providing a path for current flow in the base of said series stage transistor when said unregulated voltage is first impressed across said input terminals comprising a resistor connected between the base of said series stage transistor and said second input terminal;
   means for maintaining the voltage level across said output terminals at a predetermined value comprising:
      (a) a control transistor having a base, an emitter, and a collector;
      (b) means connecting the emitter of said control transistor to said first input terminal;
      (c) means connecting the collector of said control transistor to the base of said series stage transistor; and (d) means for sensing the voltage at said first output terminal comprising a Zener diode having its anode connected to the base of said control transistor and its cathode connected to said first output terminal;

a first resistor connected between the first output terminal and the collector of said control transistor; and a second resistor connected between the collector and base of said control transistor for decreasing the output voltage at said output terminals when the current at the output terminals increases beyond a predetermined value.

3. A regulating circuit for a source of unidirectional unregulated voltage comprising:

a first input terminal and a second input terminal between which said unregulated voltage can be applied;

a first output terminal and a second output terminal for deriving a regulated unidirectional voltage therebetween;

a series stage transistor having a base, an emitter, and a collector;

means connecting the emitter and collector of said series stage transistor to said first input terminal and said first output terminal, respectively;

means connecting said second input terminal to said second output terminal;

means for maintaining the voltage across said output terminals at a predetermined value comprising:

(a) a control transistor having a base, an emitter, and a collector;

(b) means connecting the collector of said control transistor to the base of said series stage transistor;

(c) means connecting the emitter of said control transistor to the first input terminal; and (d) means for sensing the voltage at said first output terminal and applying a signal proportional thereto to the base of said control transistor comprising a Zener diode having its anode connected to the base of said first control transistor and its cathode connected to said first output terminal;

means connecting said first output terminal to said collector of said control transistor; and means for decreasing the output voltage at said output terminals when the current at the output terminals increases beyond a predetermined value comprising a resistor connected between said collector and base of said control transistor.

4. A regulating circuit for a source of unidirectional unregulated voltage comprising:

a first input terminal and a second input terminal between which said unregulated voltage can be applied;

a first output terminal and a second output terminal for deriving a regulated unidirectional voltage therebetween;

a series stage transistor having a base, an emitter, and a collector;

means connecting the emitter and collector of said series stage transistor to said first input terminal and said first output terminal, respectively;

means connecting said second input terminal to said second output terminal;

means for maintaining the voltage across said output terminals at a predetermined value comprising:

(a) a control transistor having a base terminal, an emitter terminal, and a collector terminal;

(b) means connecting a first of said control transistor terminals to the base of said series stage transistor;

(c) means connecting a second of said control terminals to said first input terminal;

(d) means for sensing the voltage at said first output terminal and applying a signal proportional thereto to the base of said control transistor comprising a Zener diode connected between a third of said control transistor terminals and said first output terminal; and means connected between said first control transistor terminal and said third control transistor terminal for decreasing the output voltage at said output terminals when the current at said output terminals increases beyond a predetermined value.

References Cited

UNITED STATES PATENTS

| | | | |
|---|---|---|---|
| 2,888,633 | 5/1959 | Carter | 317—33 |
| 3,026,469 | 3/1962 | Wilbur et al. | 317—33 |
| 3,048,718 | 8/1962 | Starzec | 317—33 |
| 3,204,175 | 8/1965 | Kuriger | 317—33 |
| 3,217,237 | 11/1965 | Giger | 343—22 |

LEE T. HIX, *Primary Examiner.*

R. V. LUPO, *Assistant Examiner.*